United States Patent [19]

Aldrich

[11] 4,432,868
[45] Feb. 21, 1984

[54] SEPARATION OF HIGH GRADE MAGNETITE FROM FLY ASH

[75] Inventor: Robert G. Aldrich, Manlius, N.Y.

[73] Assignee: Halomet, Incorporated, Manlius, N.Y.

[21] Appl. No.: 308,379

[22] Filed: Oct. 5, 1981

Related U.S. Application Data

[62] Division of Ser. No. 146,697, May 5, 1980, Pat. No. 4,319,988.

[51] Int. Cl.³ ............................................. B02C 23/14
[52] U.S. Cl. .......................... 209/172.5; 106/DIG. 1; 252/60; 241/24; 209/39; 209/214; 209/216
[58] Field of Search ................ 209/2, 3, 10, 39, 172.5, 209/214, 216; 252/60; 264/DIG. 49; 106/DIG. 1; 241/24, 77

[56] References Cited

U.S. PATENT DOCUMENTS

| | | | |
|---|---|---|---|
| 1,512,870 | 10/1924 | Ullrich et al. | 209/214 |
| 3,021,282 | 2/1962 | Joppa | 252/60 |
| 3,672,579 | 6/1972 | Lawver | 241/24 |
| 3,769,054 | 10/1973 | Pennachetti et al. | 106/DIG. 1 |
| 4,191,336 | 3/1980 | Brown | 209/214 X |

*Primary Examiner*—Ralph J. Hill
*Attorney, Agent, or Firm*—Bert J. Lewen

[57] ABSTRACT

A unique, high-grade magnetite obtained from fly ash, the use thereof in the cleaning of coal, and low iron content fly ash.

2 Claims, 5 Drawing Figures

SEPARATION OF HIGH GRADE MAGNETITE FROM FLY ASH

This is a division of application Ser. No. 146,697, filed May 5, 1980, now U.S. Pat. No. 4,319,988, issued Mar. 16, 1982.

Electric utilities as of 1978 consumed nearly 470 million tons of coal annually in the United States. Due to ever increasing costs of petroleum-based fossil fuels and a national energy policy of reducing dependence on foreign-source fuel such as oil by shifting to coal, electric utilities are now projected to use nearly 800 million tons of coal annually by 1985. Fly ash, the predominant residue of coal burning, has in the past presented disposal problems to users of significant amounts of coal. Despite the national focus on resource recovery and recycling during the recent past decades, and the doubling of the percentage of fly ash utilized over the period 1966 to 1978, the year 1978 saw the collection of over 48 million tons of fly ash by electric utilities alone and the utilization of only 8 million tons of that total. An estimated 68 million tons of fly ash are annually produced in the United States and the significant and perhaps even dramatic anticipated shift from petroleum to coal in fossil fuel generating stations can be reasonably expected to greatly increase the amount of fly ash collected in the future.

Although to date many coal-fired generating stations have been located near sources of coal where ash disposal problems may be presumed to be minimal, as oil-fired units far removed from coal fields convert to coal under the contemporary pressures of economics and national policies, ash disposal can be expected to develop into an ever-increasing problem which, when coupled with increasingly stringent federal, state and local regulation of landfills, water quality and waste disposal generally, will present significant challenge and expense to such large scale coal users. Of the 8 million tons of fly ash utilized in 1978, almost one-third of that was utilized from disposal sites, i.e., *after* the producers of the fly ash had already incurred disposal costs.

Of the approximately 8 million tons of fly ash utilized in 1978, about two-thirds of it was used commercially in such applications as concrete products, cement, fill and the like.

Through the process of the invention about fifteen weight percent of raw fly ash can be magnetically separated out as high grade magnetite.

The fraction comprising the remaining 85 percent of raw fly ash contains less than about 40 percent, typically from about 15 to 30 percent, of its original iron content. Removal of the 15 percent of the fly ash making up the magnetic fraction would significantly reduce disposal-related transportation costs and extend the life of fly ash disposal sites. The non-magnetic fly ash fraction provided by the invention has a specific gravity of less than about 2.2, usually from about 1.9 to about 2.2. Moreover, the low iron content fly ash residue of the process provides a significantly altered product when considered in the light of both presently known commercial utilizations of fly ash and utilizations contemplated for the future. For example:

(1) Embankment and structural fill—The non-magnetic residue, typically having a specific gravity of 2.1, is somewhat lighter per unit volume than the original fly ash, which has a typical specific gravity of 2.5. This property is important in the use of fly ash for embankments or in structural fill applications.

(2) Treatment of polluted waters—In some applications, a low iron content is desirable, as well as a low specific gravity.

(3) Soil neutralization and fertilizers—In these cases, a high Ph is a desirable feature, and low iron contents for at least some fly ash materials will give this desired property.

(4) Mine reclamation—For use in mine reclamation, a fly ash with a lowered iron content will result in the formation of lower acid content mine water runoff, and is thus to be desired.

(5) Concrete blocks—A low iron content in this application will result in a reduction of block staining upon standing to weather.

(6) Cement manufacture—The applicability of the non-magnetic fly ash fraction for this particular application may be enhanced by its lower iron content.

Known prior art processes relating to the separation of fly ash into magnetic and non-magnetic fractions have generally employed the magnetic constituents in minimal technology areas. See, for example, U.S. Pat. Nos. 1,512,870 to Ulrich et al. (building sand or stone) and 4,057,512 to Vadovic et al. (landfill and blast furnace feed). Magnetic separation has also been employed in the concentration of iron ore (see, for example, U.S. Pat. Nos. 2,692,050 to Nelson; 2,990,124 to Cavanagh et al.; and 3,198,622 to Herzog et al.) and the cleaning and concentration of asbestos (U.S. Pat. Nos. 3,424,307 to Shiuh and 3,493,108 to Martinez, respectively).

Coupled with the availability of fly ash as a resource for magnetite and the resultant savings in disposal costs is the need for magnetite in the "hard rock" cleaning industry and an increasing need for coal cleaning, which process represents a second major use for magnetite.

As coal use expands, coal quality is steadily decreasing as prime coal seams are depleted and producers turn to the use of mechanized and continuous-mining methods. When ground, coal may be separated from much of the rock and other ash-forming constituents by a flotation-type separation process utilizing magnetite in admixture with water. See, for example, U.S. Pat. Nos. 3,463,310 to Ergun et al.; 3,583,560 to Cline; 3,737,032 to Burkitt; 3,794,162 to Miller et al.;4,028,228 to Ferris et al.; and 4,140,628 to Horsfall.

Coal cleaning can reduce up to 65 percent of ash, resulting in improved boiler availability and reliability, especially with older boilers. Cleaning eliminates waste product that may account for as much as 15 to 20 percent of the mass of raw coal, thereby reducing shipping expenses. Also, coal cleaning offers the possibility of eliminating some of coal's inorganic sulfur content prior to combustion, thereby reducing the load on flue gas desulfurization equipment and therefore reducing costs associated therewith, such as for sludge disposal and limestone. As much as 30 to 50 percent of the total sulfur content of coal may be subject to removal by coal cleaning, a consideration highly relevant to the reduction of acid rain.

Acid rain has been a recognized problem for some time. In addition to damaging soil, priceless and irreplaceable monuments and stone buildings, and reducing visibility, the phenomenon of acid rain kills fish in freshwater lakes and damages plant life. Acid rain has already eliminated fish from over 100 of New York State's Adirondack Mountain lakes and is rapidly killing lakes in nearby eastern Canada. Both United States and Canadian government officials have recently announced intensive efforts to attack the acid rain problem. The source of the acid precipitation is coal burning: sulfur and nitrogen oxides emitted from smokestacks are swept aloft, combine with atmospheric water vapor to form dilute sulfuric and nitric acids, and the corrosive water vapor condenses and precipitates. The problem can only be expected to intensify as more coal is burned and as coal burners seek to use higher sulfur content coal.

Magnetite is commonly used in coal cleaning installations to form the heavy medium for beneficiation, whether the separation process employed is static or centrifugal. The preference for magnetite as the heavy constituent of the separation medium arises primarily from the ability to easily recover the magnetite by means of magnets and reuse it.

Heretofore virtually all magnetite used in coal cleaning has been natural magnetite or mill scale, the magnetic oxide scale resulting from hot metal forming processes. Commercial grades of natural magnetite exhibit specific gravities in the range of 3.9 to 5.2, with 4.2 to 5.0 being the most common range. Typically the better grades of commercial magnetite comprise about 95 percent magnetics. The preferred particle size consist for magnetite used in coal cleaning operations is $-325$ mesh.

According to the present invention, magnetite having a specific gravity as high as 4.5 and comprising as much as 98 percent magnetics may be produced from fly ash. A preferred process comprises both dry and wet magnetic separation and grinding.

IN THE FIGURES

Figure 1:
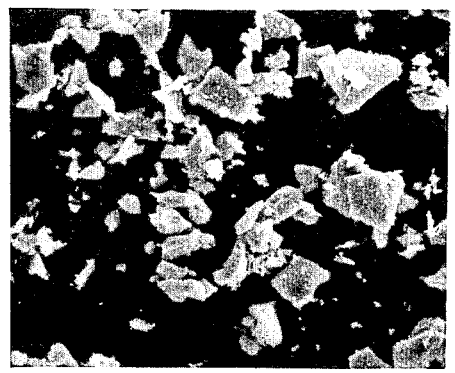
FIG. 1 is a scanning electron microscope (SEM) photomicrograph (approximately 1000×) of natural magnetite.
Figure 2:
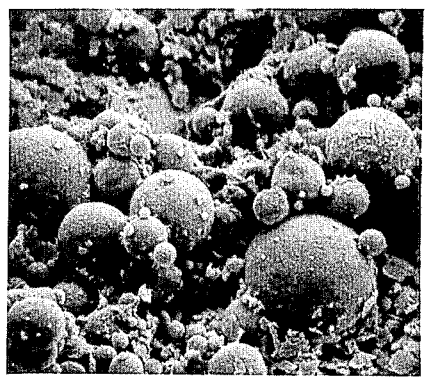
FIG. 2 is an SEM photomicrograph (2000×) of raw fly ash.
Figure 3:
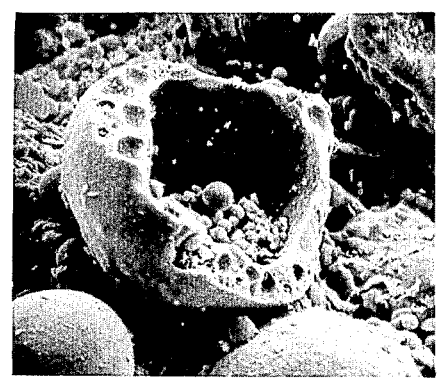
FIG. 3 is an SEM photomicrograph (2000×) of ground fly ash.

As indicated by a comparison of FIGS. 1 and 2, natural magnetite comprises roughly bar-shaped particles having sharp angular configurations whereas fly ash particles have a spherical shape. As suggested by a comparison of FIGS. 2 and 3, the spherical particles of raw fly ash comprise hollow spheres containing smaller spheres, with the wall making up the large broken sphere of FIG. 3 exhibiting spherical cavities (see generally Fisher et al., Fly Ash Collected from Electrostatic Precipitators, 192 Science 553–555 (May 1976)).

Figure 4:
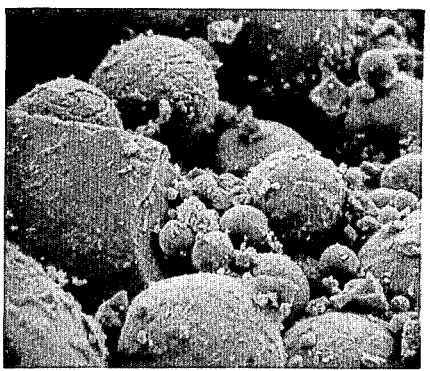
FIG. 4 is an SEM photomicrograph (2000×) of magnetite separated from fly ash.
Figure 5:
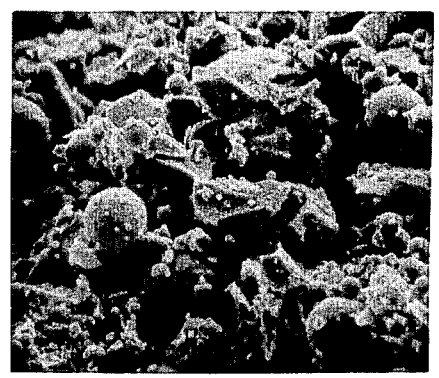
FIG. 5 is an SEM photomicrograph (2000×) of fly-ash derived magnetite ground to $-325$ mesh.

Magnetite recovered from fly ash is comprised almost entirely of spherical particles as indicated by FIG. 4 and fly-ash derived magnetite that has been ground to $-325$ mesh contains a large proportion of round particles, as shown in FIG. 5.

The separation of magnetite from fly ash according to the invention utilizes wet drum magnetic separation and preferably includes both dry and wet magnetic drum separation, with the dry separation step(s) occurring prior to wet separation. Dry separators typically maximize the quantity of magnetic material separated out of the raw fly ash feed while the wet separation enhances the quality of the recovered magnetite, apparently by aiding in the elimination of fine clay particles from the magnetite.

In the absence of any grinding of the material, magnetite recovered from fly ash in the manner here described typically comprises in excess of about 90 percent magnetics, most preferably in excess of 96 percent magnetics; has a specific gravity of at least about 3.9; and has a size distribution of 60–70 percent $-325$ mesh.

Screening of fly ash magnetite at 325 mesh typically yields an oversize material lower in specific gravity and significantly lower in percent magnetics when compared to the magnetite passing the screen. If, however, the oversize fraction is ground to pass 325 mesh and again subjected to magnetic separation, both the specific gravity and percent magnetics of the magnetite so recovered are markedly higher, with the specific gravity rising to about 4.1 to about 4.5 and the percent magnetics to as high as about 98 percent. The differences in the recovered ground material are believed attributable to the release of a more dense and highly magnetic material by the fracturing of larger spheres and the elimination of relatively lighter and non-magnetic materials comprising the shells of the larger spheres. It is therefore preferred, when a higher density magnetite product is sought, to grind at least the magnetic fraction of the fly ash to $-325$ mesh prior to the final wet magnetic separation.

The higher density magnetite has economic significance when used in coal separation plants utilizing heavy media having specific gravities ranging between 1.3 and 1.5 because a smaller volume of the higher specific gravity magnetite is required in the magnetite-water slurry to form the required medium. Where specific gravities greater than 1.5 are used, the lighter material must be used in greater volume to achieve a desired specific gravity in the heavy medium, and the crowding attendant a large particle population in a given water volume tends to increase fluid viscosity which, in turn, results in impurities not separating from the coal as rapidly as one would like. Thus separation efficiency may be somewhat impaired. It should be recognized, however, that less dense magnetite, in requiring a larger particle population to sustain any given heavy medium specific gravity, tends to result in a more uniform heavy medium that conforms more closely to the behavior of a true liquid than a heavy medium employing a higher specific gravity magnetite.

A magnetite product according to the invention contains a high proportion of round particles, the presence of which influences the performance characteristics of the magnetite. It is known, for example, as noted above, that excessive viscosity of the dense medium is detrimental to the separation of coal, particularly in static vessels. Round magnetic particles reduce viscosity by decreasing the resistance of the particles to movement both past each other and through the liquid component of the medium.

The higher percent magnetics offered by magnetite according to the invention results in a reduction of slimes (non-magnetics), and thereby lessens maintenance, in coal-cleaning systems utilizing same and reduces the money paid for non-functioning material. The larger size consist of the fly-ash derived magnetite, coupled with the improved magnetic quality, improves the material handling characteristics of such systems.

In a preferred manner of use of the present invention, large coal users, such as electric utilities, located in the vicinity of raw coal supplies or otherwise having incentives for installing coal cleaning facilities (e.g., desulfurization), would provide raw fly ash input for the magnetite recovery process, thereby reducing fly ash disposal costs and enhancing the utility of the non-magnetic fly ash fraction; a portion of the magnetite so produced would be utilized on-site in coal-cleaning processes, thereby obviating the need to purchase magnetite for same; and the remainder of the magnetite produced would be marketed.

Processes according to the invention are detailed in the following examples:

EXAMPLE I

Raw fly ash (approximately 125 kilograms) produced in a pulverized coal-fired utility boiler is fed to a high speed, permanent magnet dry drum separator at 500 FPM, 4 TPH/FT and 1,000 gauss field intensity and magnetic, middling and non-magnetic fractions collected. The non-magnetic fraction is sent to a 15-inch diameter double-roll criss-cross dry drum magnetic separator, with the non-magnetic fraction yielded in the first pass re-passed through the criss-cross dry drum, the feed rates and field strengths in both passes being approximately 1,500 LBS/HR/FT and 1,000 gauss, respectively. All magnetic fractions and the middling fraction from the first separator are slurried to about 25 percent solids in water and fed to a wet drum magnetic separator at 3 GPM and a field strength of 1,000 gauss. Non-magnetic and magnetic fractions are obtained, filtered and dried. The magnetic product from the wet drum is then repassed in the wet drum to yield a concentrate of 96.6 percent magnetics, the percent magnetics being determined by Davis Tube, and a specific gravity of 3.9.

EXAMPLE II 16.1 kilograms of fly ash produced in a pulverized coal-fired electric utility boiler, containing 10.5 percent magnetics by Davis Tube, are passed through a permanent magnet dry drum separator at approximately 1,000 gauss field strength. The non-magnetic fraction, representing approximately 71 percent of the feed, is passed through a second dry drum separator at approximately the same field strength. The magnetic fractions of both drums, representing approximately 32 percent of the feed, are then mixed with water to form a slurry of approximately 20 percent solids by weight and passed through a wet drum permanent magnet separator at about 3 GPM. Field intensity for the wet drum is 1,000 gauss. The magnetic product is collected, weighed and its magnetics content determined using Davis Tube to show a magnetic product of 96.1 percent magnetics, representing 8.4 percent by weight of the feed and an 84.6 percent total recovery of available magnetics. The specific gravity of the magnetic product is 3.9.

EXAMPLE III

Fly ash (approximately 2,727 kilograms) produced in a pulverized coal-fired utility boiler is mixed with water in a slurry mixing tank. The solids are adjusted to approximately 25% by weight and fed to a 1,000 gauss wet drum separator. The non-magnetic fraction has a specific gravity of 2.1 and the magnetic fraction is re-passed to obtain approximately 300 kilograms of magnetic product at 91 percent magnetics as measured by the Davis Tube and having a specific gravity of 3.9. The magnetic product is tested in an eight-inch, heavy medium cyclone coal-cleaning circuit and the quality of coal product obtained is comparable to that attainable using commercially available natural magnetite.

EXAMPLE IV

A 4.5 kilogram sample of the 300 kilogram magnetic product of Example III is screened at 325 mesh. The −325 mesh portion contains 95 percent magnetics by the Davis Tube and the oversize material, 88 percent magnetics. The oversize material, representing about 30 percent of the starting sample, is ground in a jar mill to pass 325 mesh. After final separation in a wet magnetic separator, the magnetics content of the magnetic portion of the ground material increases to 96 percent and the material has a specific gravity of 4.2. Fly ash magnetite, with a size consist essentially −325 mesh, 96 percent magnetics and a specific gravity of 4.2, is mixed with water in the head tank of a heavy medium cyclone coal beneficiation plant to produce a slurry density appropriate for the separation of pyrites and ash-forming impurities from a bituminous coal. After screening the coal feed using wet sizing screens and sieve bends, the resulting ¼"×28 mesh size consist is mixed with the magnetite slurry in the head tank. The mixture thereupon is fed to the inlet of a 14-inch cyclone, where the combination of centrifugal force and gravity in the presence of the magnetite/$H_2O$ slurry serve to separate coal from non-coal constituents. The overflow mixture of coal, magnetite and water is passed over a sieve bend and then a vibrating wet screen. The washed coal is essentially magnetite free and passes to other unit operations in the plant. The dilute medium, predominantly magnetite and rinse water but with some nonmagnetic particles, is passed to the final wet drum separation section of the fly ash magnetite wet magnetic separator. The wet magnetic separator recovers and concentrates the magnetite which is sent again, along with fresh makeup from the same separator, to the heavy medium cyclone head tank. The nonmagnetic particles which otherwise would accumulate in the heavy medium cyclone circuit are thus removed from the system. Similarly, the underflow from the heavy medium cyclone, containing magnetite, water, and rock and mineral matter is classified using a sieve bend and wet vibrating screen with the oversize material, basically free of magnetite, reporting to refuse and the dilute medium reporting to the final fly ash magnetic separator for the same purpose as previously described.

EXAMPLE V

A 500 gram sample of the magnetic product produced in Example I is screened at 325 mesh. Approximately 36.5 percent of the magnetic product is oversize material. The oversize material is ground in a laboratory jar mill to pass 325 mesh, slurried with water and finally passed through a magnetic separator. The magnetic product contains 98 percent magnetics by Davis Tube and has a specific gravity of 4.3. Fly ash magnetite, with a size consist essentially −325 mesh, 98 percent magnetics and a specific gravity of 4.3, is mixed with water in the head tank of a heavy medium vessel coal beneficiation plant. Coal, wet screened and sized at +¼ inch, is added to and mixed in the head tank and the resulting feedstock introduced to the heavy medium vessel. The amount of magnetite added to the water to form the heavy medium is calculated based on the specific gravity of the coal product and is generally chosen such that large proportions of the product do not fall within 10% of the specific gravity of the medium. The overflow material from the bath, consisting mostly of coal, magnetite and water, is screened and washed to separate coal product for shipment or further processing. The finely divided magnetite passes through the screens, is separated thus from the coal, and is sent to the final wet magnetic separator section of the above-described fly ash magnetite recovery process. The magnetite is separated and concentrated in the magnetic separator and sent again, with fresh makeup, to the heavy medium vessel head tank. Nonmagnetic slimes, otherwise accumulating in the coal-cleaning circuit, are removed. The underflow material from the heavy medium vessel, containing water, magnetite and refuse materials, undergoes similar processing to recover and concentrate magnetite for reuse and to isolate coal refuse and medium slimes for disposal.

I claim:

1. Magnetite derived from fly ash obtained as a product of coal combustion which comprises an admixture of spherical particles and broken spherical particles, the broken spherical particles being obtained by grinding spherical particles having a size greater than 325 mesh; said magnetite having a percent magnetics of at least about 96% as measured by Davis Tube and a specific gravity of from about 4.1 to about 4.5 and consisting essentially of particles less than 325 mesh.

2. The magnetite of claim 1 wherein the major portion of the magnetics is in the form of spherical particles.

* * * * *